United States Patent [19]

McClelland

[11] 4,286,576
[45] Sep. 1, 1981

[54] SOLAR ENERGY THERMALIZATION AND STORAGE DEVICE

[75] Inventor: John F. McClelland, Ames, Iowa

[73] Assignee: The United States of America as represented by the United States Department of Energy, Washington, D.C.

[21] Appl. No.: 61,321

[22] Filed: Jul. 26, 1979

[51] Int. Cl.³ .................................................. F24J 3/02
[52] U.S. Cl. .................................. 126/428; 126/449; 126/450
[58] Field of Search .............. 126/428, 430, 431, 434, 126/436, 441, 449, 400, 900, 417, 450; 52/171, 789; 165/104 S, 104 M

[56] References Cited

U.S. PATENT DOCUMENTS

| 504,544 | 9/1893 | Heyden | 126/431 X |
|---|---|---|---|
| 2,237,566 | 4/1941 | Land | 52/789 |
| 3,239,144 | 3/1966 | Lueder | 126/428 X |
| 4,074,482 | 2/1978 | Klahr | 52/171 |
| 4,108,373 | 8/1978 | Chiapale et al. | 126/431 |

FOREIGN PATENT DOCUMENTS

| 2815056 | 10/1979 | Fed. Rep. of Germany | 52/171 |
|---|---|---|---|
| 2307234 | 11/1976 | France | 126/441 |

Primary Examiner—Edward G. Favors
Assistant Examiner—Harold Joyce
Attorney, Agent, or Firm—James W. Weinberger; Frank H. Jackson; James E. Denny

[57] ABSTRACT

A passive solar thermalization and thermal energy storage assembly which is visually transparent. The assembly consists of two substantial parallel, transparent wall members mounted in a rectangular support frame to form a liquid-tight chamber. A semitransparent thermalization plate is located in the chamber, substantially paralled to and about equidistant from the transparent wall members to thermalize solar radiation which is stored in a transparent thermal energy storage liquid which fills the chamber. A number of the devices, as modules, can be stacked together to construct a visually transparent, thermal storage wall for passive solar-heated buildings.

7 Claims, 1 Drawing Figure

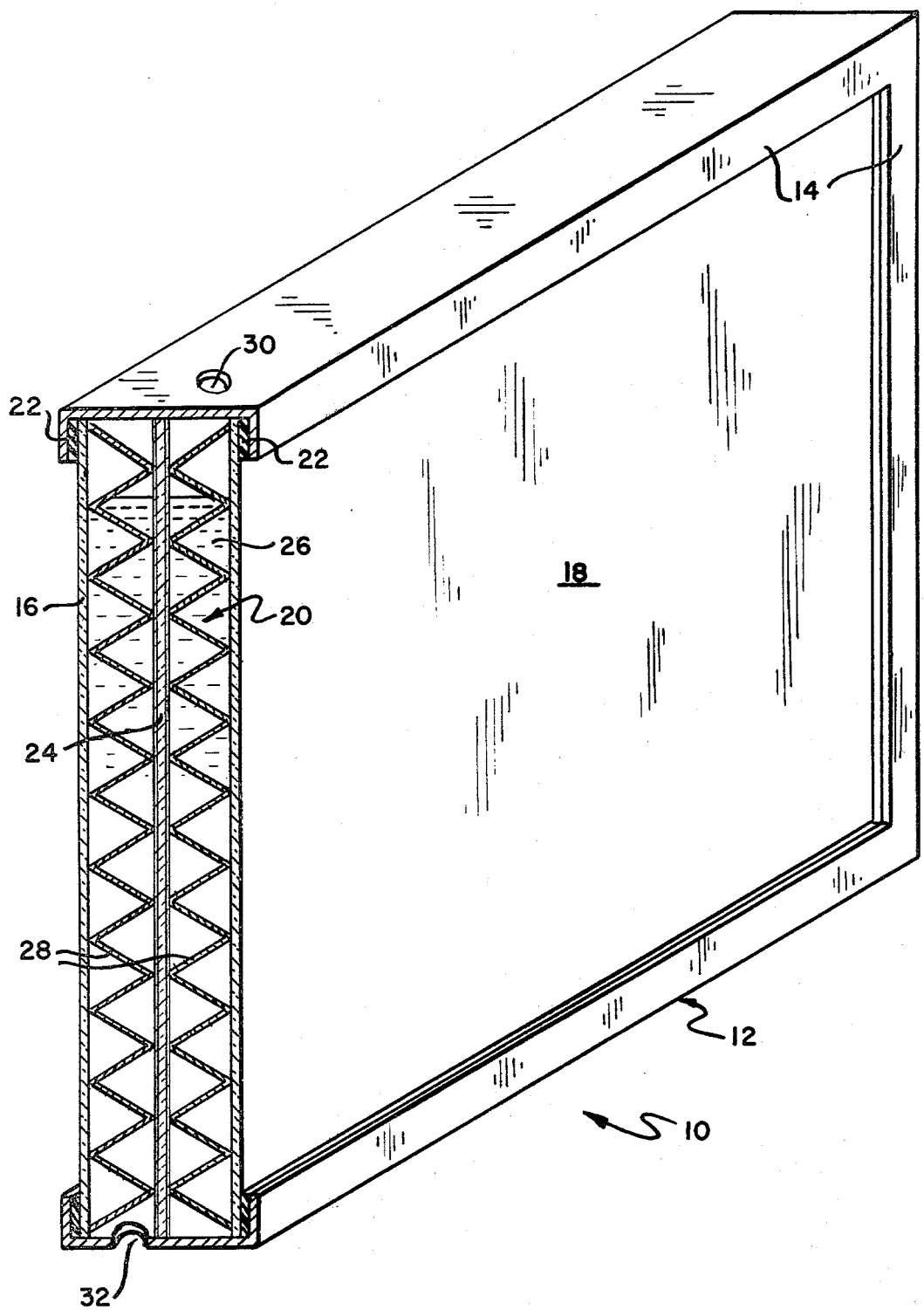

SOLAR ENERGY THERMALIZATION AND STORAGE DEVICE

CONTRACTUAL ORIGIN OF THE INVENTION

The invention described herein was made in the course of, or under, a contract with the U.S. Department of Energy.

BACKGROUND OF THE INVENTION

This invention relates to a passive solar energy system. More specifically this invention relates to a thermal energy storage assembly which is visually transparent. Still more specifically, this invention relates to an assembly which can be used, as modules, to establish a visually transparent thermal energy storage wall for passive solar-heated buildings.

Interest in utilizing solar energy for space heating of buildings has increased substantially with the decreasing supply and increasing cost of fossil fuels for this purpose. Devices or systems for the utilization of solar energy are generally categorized as either active or passive. An active system utilizes solar collectors, some form of thermal storage and some means for circulating thermal energy between components. Although such systems are generally effective, they are expensive to install and require substantial maintenance.

The passive approach for solar heating of buildings has recently been recognized as an alternative to active systems because of relatively low cost, long-term reliability and operational simplicity. A passive system absorbs and thermalizes solar energy and then transfers heat through a thermal storage medium to the building heating load without the use of active components such as mechanical pumps. The more efficient passive systems tend to share the same space with the building interior as in the case of the Trombe wall system as described in U.S. Pat. No. 3,832,992 where a thermally massive concrete wall is located in the interior adjacent to the solar gain fenestration: generally facing toward the south. Sunlight is absorbed and thermalized on the wall's exterior-facing surface. Part of the resulting heat is stored in the wall and transferred to warm the interior by conduction, convection, and radiation.

Other passive systems utilize a water wall consisting of opaque or translucent containers of metal, fiberglass or plastic, filled with water and placed or stacked behind windows having a southern exposure as thermal energy storage units.

Both the concrete wall and the water wall storage systems block the entrance of light into the spaces to be heated and thus additional energy consumption may be required for lighting. Because of the necessary massive nature and weight of either a concrete wall or a stack of cylindrical storage containers filled with water, it is difficult, if not impossible, to retrofit existing houses or buildings with either of these passive solar storage systems.

Thus it is important that any passive thermal energy storage system have maximum flexibility to accommodate the general interior use requirements of buildings in the context of both retrofits and new construction. Therefore a suitable passive system should provide both high solar heating efficiency and flexibility for interior integration in a wide range of buildings types.

SUMMARY OF THE INVENTION

A new, solar-thermal conversion assembly with thermal energy storage capacity has been developed for use with passive solar heating systems which is visually transparent and which can be used to construct a directly irradiated thermal storage wall structure which will take the place of visually opaque concrete walls or water thermal storage walls. The assembly of the invention consists of first and second transparent wall members substantially parallel to, and spaced from each other, a semitransparent solar thermalization plate located between the wall members and substantially parallel to both, sealing means between the first and second wall members for forming a liquid-tight chamber containing the thermalization plate and a transparent thermal energy storage liquid in the chamber. The wall members are sealed in a rectangular frame to form modules which may be stacked to form a visually transparent storage wall. The chamber may also contain a plurality of transparent baffle means between the thermalization plate and the walls for preventing convective heat transfer within the storage liquid.

The assembly has several advantages over prior art thermal storage walls in addition to that of being visually transparent. For example, the devices can readily be made modular so that they then can be easily transported and assembled to construct a storage wall which can be readily retrofitted in buildings already constructed. A wall of the assemblies which contain a storage fluid such as water would be substantially lighter in weight than a similar wall of concrete and have a higher heat capacity per mass and per volume over that of concrete. The design of the assembly provides for more direct and rapid heating of the thermal storage medium than is provided by prior art water wall storage systems because the solar energy is thermalized in the center of the storage medium rather than on the outer wall.

The modular units are located in a building adjacent to solar-gain fenestration where they thermalize and absorb solar energy transmitted by the fenestration. Part of the resulting heat is transferred to the building interior at the inner wall. The system will provide a substantial solar heating fraction for a well designed building.

It is therefore one object of the invention to provide a passive solar heating and thermal energy storage device that is visually transparent.

It is the other object of the invention to provide a passive solar heating and thermal energy storage device that is visually transparent and can be made modular in design so that it can be readily retrofitted to existing buildings.

BRIEF DESCRIPTION OF THE DRAWING

The drawing is a partially cut away, side perspective view of an assembly in accordance with the invention.

DETAILED DESCRIPTION OF THE PREFERRED EMBODIMENT

Referring to the drawing, there is shown the modular passive solar heating assembly 10 which can be installed directly behind solar-gain fenestration in a building. The assembly 10 consists of a generally rectangular frame 12, shown partially cut away at one end, which is formed of channel-shaped sections 14 which provide the structural support for the module. Mounted in frame 12 are a pair of spaced, substantially parallel, transparent first and second wall members 16 and 18 respectively, which may be formed of clear glass and which, together with frame 12, form a thermal energy storage chamber 20. Seals 22 between wall members 16 and 18 and frame 12 prevent leakage from chamber 20. Also mounted in frame 12 within chamber 20 between walls 16 and 18 and substantially parallel therewith is a semitransparent thermalization plate 24 for thermalizing the solar energy and converting it to thermal energy. Chamber 20 is filled with a thermal energy storage medium 26 such as water which absorbs the thermal energy from the heat-absorbing plate 24. A transparent horizontal accordion-pleated baffle 28 is located in chamber 20 between plate 24 and walls 16 and 18 for preventing convective heat transfer within the heat storage medium. Frame 12 may be fitted with an upper port 30 for filling and a lower port 32 for draining the heat storage medium from the assembly. The assembly may also include a locking mechanism (not shown) in each edge of frame 12 so that a number of the assemblies as modules can be stacked horizontally and fastened or locked together in order to form a passive thermal energy storage wall.

For the greatest combined thermalization efficiency and visual transparency, the semitransparent thermalization plate should absorb about 80% and transmit 20% of the incident solar energy, although it may have a transmission range of from about 10 to 30%. Such plates may be of an appropriate glass such as "solarbronze" glass manufactured by Pittsburgh Plate Glass Corp. or a plastic such as a member of the Plexiglas solar control series manufactured by Rohm and Haas.

The heat storage medium is preferably water in order to be economical and to maintain visual transparency and retain high heat capacity. It may be necessary to add other compounds to the water as necessary to prevent freezing or eliminate algae growth. Other fluids having high heat capacity and/or latent heat may also be suitable.

The transfer of heat through the storage medium is rapid in an unquenched assembly due to convection, resulting in small temperature differences across the structure. Enhanced performance can be achieved when the transfer rate is reduced to that approaching conductive transfer by a combination of baffles and a gelling compound. The latter can increase the kinematic viscosity of the liquid from $1.0 \cdot 10^{-6} m^2/sec$ to approximately $5.0 \cdot 10^{-2} m^2/sec$ for a 1% by weight solution of a gelling agent such as Carbopol 940 manufactured by B. F. Goodrich Chemical Co. The corresponding change in the Rayleigh number for an assembly under typical operating conditions is from $2.5 \cdot 10^8$ to $5.0 \cdot 10^3$.

In operation, sunlight incident on the assembly experiences a small initial reflection loss (typically 4%) at the air-to-glass interface before entering the assembly structure. The near infrared portion of the solar spectrum is absorbed in a thin outer layer of the water-based storage liquid. Approximately 65% of the incident sunlight reaches the partially absorbing plate where 80% is absorbed. This results in slightly more than 50% of the solar energy incident on the assembly being thermalized and initially deposited as heat at the center of the storage medium rather than at the exterior surface as in a Trombe wall.

Additional solar heating is provided to the interior by light transmitted through the assembly (approximately 13% of the incident light) via direct gain. This light also provides interior lighting and a visual image of the exterior.

Solar heating simulation for a test module environment has shown that a 15.2 cm (6") thick device of the invention filled with water and absorbing 80% of the incident solar energy should perform comparably to or better than a 33 cm (13") thick concrete wall which has the same thermal storage capacity.

It can be seen that the device of the invention provides an effective, economical and visually acceptable means for providing a thermal energy storage wall for use with a passive solar system.

The embodiments of the invention in which an exclusive property or privilege is claimed are defined as follows:

1. A visually transparent, passive solar thermalization and thermal energy storage assembly comprising:
    a first transparent substantially planar wall member,
    a second transparent substantially planar wall member, the second member being substantially parallel to and spaced apart from the first member,
    a semi-transparent substantially planar thermalization plate located between the wall members and substantially parallel to both,
    sealing means between the first and second wall members for forming a liquid-tight chamber containing the thermalization plate,
    a transparent, thermal energy storage liquid in the chamber
    and means for preventing convective heat transfer within said liquid, said means for preventing convective heat transfer consisting of a plurality of visually transparent, horizontal accordian pleated baffles positioned between the thermalization plate and each wall member.

2. The assembly of claim 1 wherein the wall members are mounted in a frame for structural support.

3. The assembly of claim 1 wherein the thermal energy storage liquid is water.

4. The assembly of claim 3 wherein the water contains a viscosity increasing agent.

5. A modular, visually transparent, passive solar thermalization and thermal energy storage assembly comprising:
    an open, rectangular-shaped support frame having substantially parallel first and second open sides,
    a first transparent wall member in the first open side,
    a second transparent wall member in the second open side, the two wall members together with the frame forming a liquid-tight chamber within the frame,
    a semitransparent thermalization plate in the chamber, the plate being parallel with and spaced about equidistant between the two walls,
    a transparent, thermal energy storage fluid within the chamber,
    and means for preventing convective heat transfer within said storage fluid, said means for preventing convective heat transfer consisting of a plurality of visually transparent, horizontal accordian pleated baffles positioned between the thermalization plate and each wall member.

6. The assembly of claim 5 wherein the thermal storage fluid is water.

7. The assembly of claim 6 wherein the water also contains a viscosity-increasing agent.

* * * * *